Patented Apr. 28, 1953

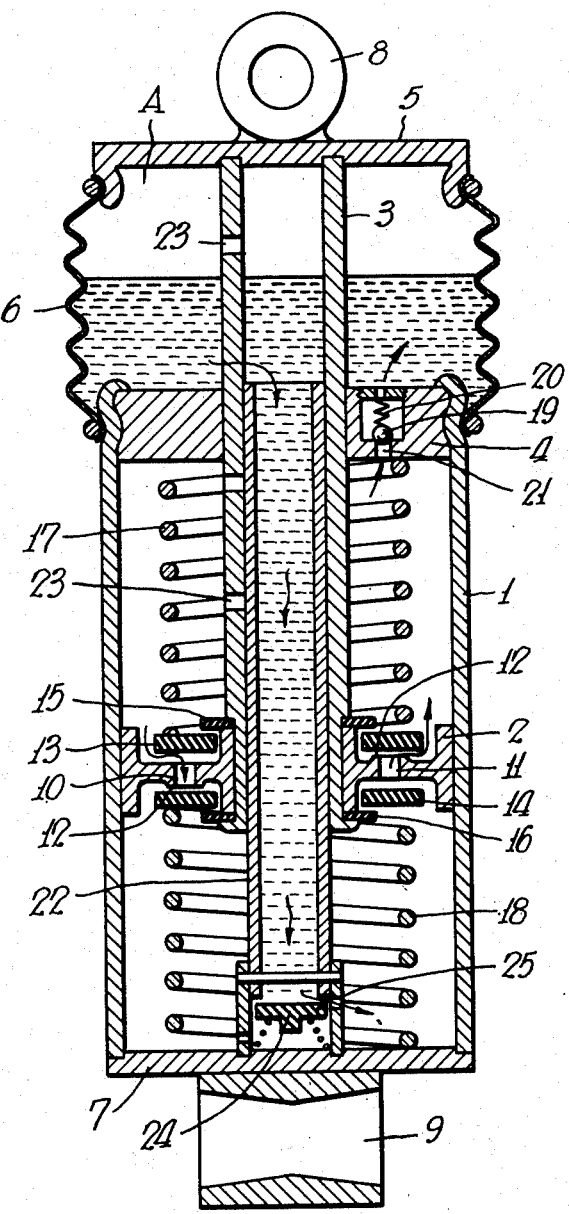

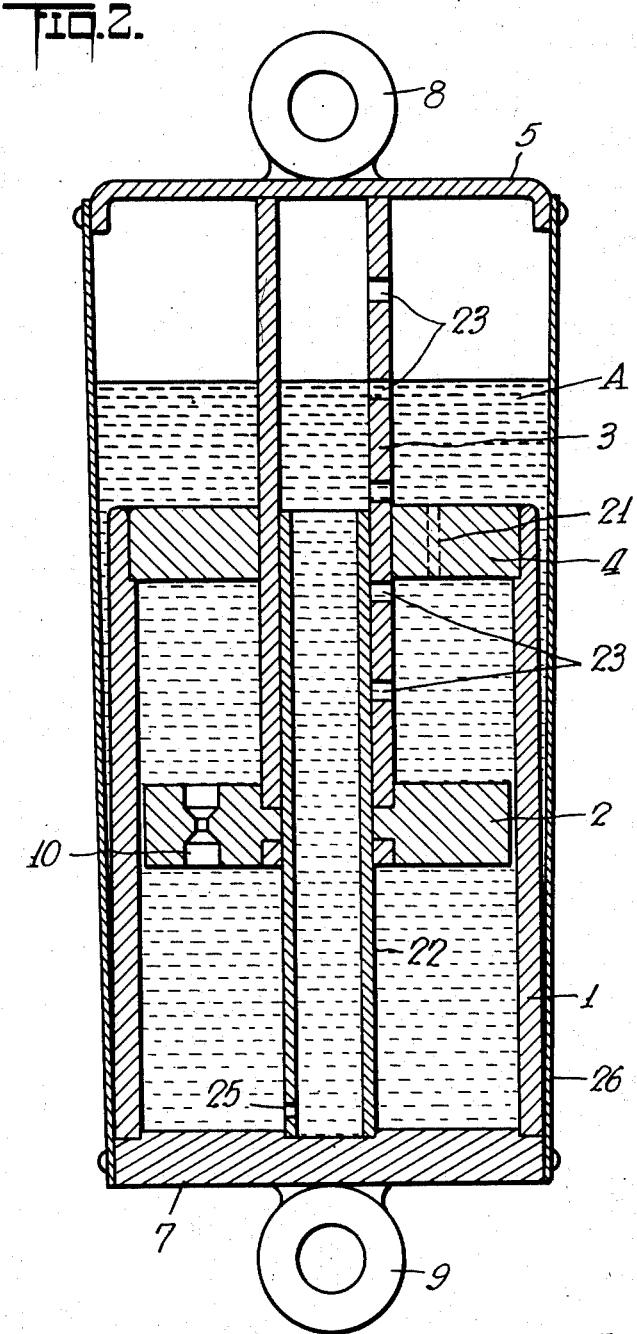

2,636,726

UNITED STATES PATENT OFFICE 2,636,726

COUNTER ROD SHOCK ABSORBER

Jean Mercier, New York, N. Y.

Application March 9, 1950, Serial No. 148,606
In France January 20, 1950

4 Claims. (Cl. 267—8)

The object of the present invention is an improvement in shock absorbers comprising a bellows or telescopic chamber acting as a liquid tank; this improvement being for the purpose of always ensuring a correct filling up of the cylinder of the shock absorber with liquid (oil, for instance).

This improvement consists essentially in combining with a hollow piston rod bored along its length with spaced apertures a counter-rod, also hollow, associated with the cylinder of the shock absorber and whereon slides the hollow piston rod.

This arrangement enables the liquid from the liquid tank of the shock absorber to supply the lower portion of the cylinder of said shock absorber through the apertures of the hollow piston rod, said hollow piston rod, the hollow counter-rod and one or more apertures provided at the lower part of the counter-rod.

Figs. 1 and 2 of the appended drawing show in vertical section, by way of non-limitative examples, two types of embodiment of the object of the invention in vertical section.

The shock absorber represented in Figure 1 is of the type partially described by the applicant, and which was the object of the patent applications for a shock absorber, U. S. Serial Numbers 642,925 and 659,924, now U. S. Patents No. 2,496,952, dated February 7, 1950, and No. 2,565,617, dated August 28, 1951, respectively.

This shock absorber consists of a cylinder 1, inside which moves a piston 2, the rod of which 3 goes through the top 4 of the cylinder and carries at its outside end a disc 5; a bellows 6 is secured, on one hand to said disc 5 and on the other hand to the upper edge of cylinder 1.

The bellows 6 (which may be made of leather, rubber or any other equivalent material), the disc 5 and the top 4 limit a flexible chamber A, forming a liquid tank.

The disc 5 and the bottom 7 of the cylinder are connected respectively at 8 and 9 to the elements (chassis, and axles of a vehicle, for example, or the like), between which a shock absorbing action is to be obtained.

The piston 2 is drilled with a series of apertures such as 10 and 11, and comprise alternately a seat 12 on one or the other face of the piston. On these seats 12 may rest two annular flaps 13 and 14, which move between said seats and annular steps 15—16 carried by piston 2.

Each one of the flaps 13—14 is subjected to the action of a spring 17—18 which presses: one on the top 4 and the other one on the bottom 7 of cylinder 1.

No tightness packing is provided at the passage of the piston rod 3 through the guiding top 4 of the cylinder; slight leaks which may result from this arrangement return directly to tank A.

The top of cylinder 1 carries a safety valve consisting, for example, of a ball 19 subjected to the action of a spring 20 and stopping an aperture 21 drilled in the top 4. The purpose of this valve is to limit, in a known manner, to an allowable maximum the stress exerted by the piston 2 when it moves away, while going upwards, from its position of equilibrium, by opening, it will then allow the liquid which is above the piston to flow into the tank A through aperture 21.

The piston rod 3 is hollow and slides along a counter-rod 22, also hollow, secured to the bottom 7 of the cylinder. Along its length, from place to place, the hollow piston rod 3 is drilled with apertures 23.

Finally, an intake valve with a small inertia, comprising preferably a light return spring 24 is arranged at the lower end of the hollow counter-rod 22 and allows the liquid from tank A to flow into the lower portion of cylinder 1 through an aperture 25.

The operation of the shock absorber is similar to that of the shock absorbers described in the above mentioned patent applications. If the piston 2 moves downwards, the flap 14 closes on the seat 12 of apertures such as 10 and is pressed against these seats by the spring 18, while flap 13 opens and allows the free flow through apertures 11, from the space under the piston into the space above said piston, of the liquid (oil for instance), which fills cylinder 1 (and partly the tank A).

During this run of the piston, no damping effect occurs.

During the return stroke of the piston towards its position of equilibrium (represented on the figure), the flap 13 closes and the flap 14 remains closed under the action of the spring 18; thus the liquid cannot flow from the upper portion of the cylinder into the lower portion of the latter, since all apertures 10—11 are stopped. In order to flow into said lower portion, the liquid must overcome the action of the spring 18 which, as the piston moves closer to its equilibrium position, is attenuated more and more rapidly.

The result is a damping effect, very strong at first, and then decreasing more and more rapidly.

The same phenomena would take place if the piston were moving in opposite direction from its equilibrium position; the gradually decreasing damping action will then take place when the piston moves back to its equilibrium position and when the liquid tries to flow from the lower into the upper portion of cylinder 1 against the action of spring 17.

The arrangement of the hollow piston rod 3, drilled with holes, and of the hollow counter rod 22 allows (if the shock absorber is vertical or inclined, the piston rod upwards), the gathering of the air at the upper part of the liquid tank A. The liquid from the latter can, at the same time, feed into the lower portion of cylinder 1 through the valve 24; said liquid flowing into the hollow counter rod through apertures 23 of the piston rod, which are masked by the counter rod 22 as the piston 2 moves down into the cylinder.

The exhaust valve 19—20 might also be arranged in the counter rod 22.

If the suspension of the vehicle to be damped, for instance, has a variable flexibility, it will be preferable to provide springs 17—18 with a variable, homothetic elasticity.

There is shown, in Figure 2, a greatly simplified form of embodiment of the invention wherein the shock absorber is of a type comprising no flap or valve, but only apertures of well gauged dimensions.

One finds again, in this figure, the cylinder 1 of the shock absorber, its piston 2 with its hollow rod 3 provided with apertures 23; the hollow counter rod 22 secured to the bottom 7 of cylinder 1, and bored at its lower portion with an aperture 25 for the flowing of the liquid (oil for instance). Piston 2 is bored with a gauged port 10.

The upper end wall 4 of cylinder 1 is bored with a port 21.

The liquid tank A is limited by a rubber sheath 26 capable of extension (or a bellows), secured on one hand on the bottom 7 of the cylinder and on the other hand on a disc 5 carried by the upper end of the piston rod 3.

The operation of the shock absorber is easily understood.

The displacements of the piston are damped in both directions by the passage of oil through the gauged port 10, from one of the capacities of the cylinder into the other; and this gauged port opposes rapid oscillations.

The gauged port 21, which may be omitted, is for the purpose of cooperating in the limitation to an acceptable maximum of the stress exerted by the piston 2 when it moves upwards towards the upper end wall 4, away from its equilibrium position, or when it moves down again, since the lower surface of the piston is larger than its upper surface.

The gathering of the air is effected, as in the previous example of embodiment, at the upper portion of the liquid tank A. And the liquid from said tank can feed into the lower capacity of cylinder 1 through the hollow rod 3 and counter rod 22 and their respective ports 23 and 25.

What is claimed is:
1. A shock absorber comprising a substantially cylindrical casing, a wall closing one end of said casing, a plug in the other end of said casing, said plug having an axial bore therethrough, a collapsible chamber affixed to said casing at the plug end thereof, said chamber having an end wall, a piston slidably mounted in said casing, said piston having an axial bore therethrough, a piston rod affixed at one end in the bore of said piston and extending through the bore in said plug into said chamber, said piston rod being affixed to the end wall of said chamber and having a longitudinal bore therethrough and a plurality of ports therethrough into said longitudinal bore, said piston having a plurality of bores therethrough, said latter bores each having an outstanding rim at one end thereof, at least one of said rims being positioned on each side of said piston, means coacting with said rims, positioned on each side of said piston to close the associated bore in said piston, resilient means normally retaining said closure means on said rims, a hollow counter rod affixed at one end to the end wall of said casing and extending through said hollow piston rod, a liquid passageway from said casing into said hollow counter rod near the affixed end thereof, the other end of said hollow counter rod being in communication with said chamber through the ports in said piston rod.

2. The combination set forth in claim 1 in which said collapsible chamber is a bellows.

3. The combination set forth in claim 1 in which said collapsible chamber is a bellows, a passageway is provided through said plug between said bellows and said casing and valve means are provided normally closing said passageway.

4. The combination set forth in claim 1 in which valve means are provided at the affixed end of said hollow counter rod, normally to close the passageway from said casing into said hollow counter rod.

JEAN MERCIER.

References Cited in the file of this patent

UNITED STATES PATENTS

| Number | Name | Date |
|---|---|---|
| 1,178,996 | Duffing | Apr. 11, 1916 |
| 1,444,248 | Hofmann | Feb. 6, 1923 |
| 2,084,320 | Coleman | June 22, 1937 |
| 2,215,751 | Coleman | Sept. 24, 1940 |
| 2,256,868 | Perkins | Sept. 23, 1941 |
| 2,452,885 | Willard | Nov. 2, 1948 |
| 2,472,840 | Lewton | June 14, 1949 |
| 2,536,626 | Coleman | Jan. 2, 1951 |

FOREIGN PATENTS

| Number | Country | Date |
|---|---|---|
| 290,983 | Great Britain | Nov. 15, 1928 |